US012705462B1

(12) United States Patent
Antebi et al.

(10) Patent No.: US 12,705,462 B1
(45) Date of Patent: Aug. 11, 2026

(54) DECODER ARCHITECTURE FOR EARLY-STOP AUTOMATED RETRIEVAL AUGMENTED GENERATION

(71) Applicant: INTUIT INC., Mountain View, CA (US)

(72) Inventors: Sagiv Antebi, Tel Aviv (IL); Matan Vetzler, Givat-Shmuel (IL); Ofir Ben Shoham, Hod Hasharon (IL); Shai Ardazi, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/308,809

(22) Filed: Aug. 25, 2025

(51) Int. Cl.
*G06N 3/0475* (2023.01)
*G06N 3/048* (2023.01)
*G06N 3/09* (2023.01)

(52) U.S. Cl.
CPC .......... *G06N 3/0475* (2023.01); *G06N 3/048* (2023.01); *G06N 3/09* (2023.01)

(58) Field of Classification Search
CPC ......... G06N 3/0475; G06N 3/09; G06N 3/048
See application file for complete search history.

(56) References Cited

U.S. PATENT DOCUMENTS

2025/0190460 A1* 6/2025 Madisetti ........... G06F 16/3329

OTHER PUBLICATIONS

Ganesh, S., & Purwar, A. (2024). Context-augmented Retrieval: A Novel Framework for Fast Information Retrieval based Response Generation using Large Language Model. arXiv preprint arXiv:2406. 16383. (Year: 2024).*

Sridhar, K., Dutta, S., Jayaraman, D., & Lee, I. (2024). Regent: A Retrieval-Augmented Generalist Agent That Can Act In-Context in New Environments. arXiv preprint arXiv:2412.04759. (Year: 2024).*

* cited by examiner

*Primary Examiner* — Kamran Afshar
(74) *Attorney, Agent, or Firm* — Patterson + Sheridan, LLP

(57) ABSTRACT

Aspects of the present disclosure relate to a decoder model architecture that is optimized for retrieval augmented generation (RAG) applications. Embodiments include a generative machine learning model that comprises one or more hidden decoder layers and an output layer. In certain embodiments, the output layer includes a stop head layer configured to generate, based on a hidden state output generated by a given hidden layer of the one or more hidden decoder layers, a stop output indicating a likelihood of performing a subsequent context retrieval. Some embodiments provide that the output layer includes a softmax head layer parallel to the stop head layer. In certain embodiments, each of the one or more hidden decoder layers and the output layer comprise a plurality of neurons organized in an array, wherein each neuron comprises a register, a microprocessor, and at least one input. The neurons may be connected using synaptic circuitry.

18 Claims, 5 Drawing Sheets

DECODER ARCHITECTURE FOR EARLY-STOP AUTOMATED RETRIEVAL AUGMENTED GENERATION

INTRODUCTION

Aspects of the present disclosure relate to optimized generative machine learning systems that minimize the number of retrievals performed in a retrieval augmented generation process. In particular, embodiments disclosed herein relate to a generative machine learning model that includes a stop head layer that is configured to indicate whether subsequent retrievals are necessary based on a hidden state output generated by a decoder layer of the model.

BACKGROUND

Generative artificial intelligence systems are used by a growing number of people, businesses, and organizations around the world to automate tasks. These systems rely on generative machine learning models to generate responses to queries (such as queries submitted by users or queries submitted by automated processes). For example, a user query may include a question. The generative machine learning model may generate an answer to the question and the answer may then be provided to the user. To generate robust and accurate responses to user queries, generative artificial intelligence systems may utilize a process known as retrieval augmented generation (RAG) to retrieve relevant contextual information for a query. For example, an embedding representation of a query may be generated and used by a generative artificial intelligence system to identify documents that are semantically similar to the query. The semantically similar documents may then be provided as part of the input to the machine learning model, which may then generate a response to the query based on the identified documents.

A RAG process may involve multiple "steps" in which the generative artificial intelligence system retrieves additional context based on outputs generated by the generative model in response to previously retrieved context. For example, a first set of context may be retrieved based on a user query, and the generative machine learning model may generate a first output based on the query and first set of context. Then, a second set of context containing the additional information may be retrieved, and the full response may be generated based on the second set of context.

However, existing RAG-based generative artificial intelligence systems may, in many cases, fail to retrieve a sufficient amount of context to generate a full and accurate response to a user query. In other cases, existing RAG-based technologies may perform more retrieval steps than necessary, resulting in excessive latency and computational cost. Additionally, the inconsistency of these existing technologies makes implementing performance adjustments extremely difficult.

Accordingly, there is a need in the art for improved RAG-based generative artificial intelligence systems.

BRIEF SUMMARY

Certain embodiments provide a generative machine learning system. The generative machine learning system generally includes: a generative machine learning model including: one or more hidden decoder layers; and an output layer comprising: a stop head layer configured to generate, based on a hidden state output generated by a given hidden layer of the one or more hidden decoder layers, a stop output indicating a likelihood of performing a subsequent context retrieval; and a softmax head layer parallel to the stop head layer. The generative machine learning system may further include a retrieval component configured to perform the subsequent context retrieval based on the stop output exceeding a threshold.

Some embodiments provide a method for retrieval augmented generation. The method generally includes: retrieving a context based on an input query; generating, via a generative machine learning model, a hidden state output based on the context and the input query; generating, via a stop head layer of the generative machine learning model based on the hidden state output, a stop output indicating a likelihood of performing a subsequent context retrieval; and either: performing, based on the stop output exceeding a threshold, the subsequent context retrieval and using the generative machine learning model to generate a subsequent hidden state output based on additional context retrieved in the subsequent context retrieval; or generating a final output for the input query based on the hidden state output.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer readable storage medium comprising code for performing the aforementioned method as well as those further described herein; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for retrieval augmented generation (RAG) using generative machine learning models.

According to certain embodiments, a generative machine learning system includes a generative machine learning model. The generative machine learning model may include multiple hidden decoder layers through which inputs to the model are processed. The model may further include an output layer. The output layer may include a softmax layer that is used to generate tokens based on an output of a hidden decoder layer. As described herein, the output layer may further include a stop head layer that may be parallel to the softmax layer (e.g., such that the stop head layer may execute in parallel with the softmax layer). The stop head layer may be configured (e.g., trained) to generate a stop output that indicates the likelihood of performing a subsequent context retrieval. If the stop output exceeds a threshold, a subsequent context retrieval may be performed via a RAG process. If the stop output does not exceed the threshold, a final output generated by the softmax layer may be provided to a user.

Embodiments of the present disclosure provide numerous technical and practical effects and benefits. Specifically, embodiments disclosed herein significantly optimize the performance and efficiency of RAG systems. For example, by utilizing technologies disclosed herein, excessive retrievals (and the excessive computing resource consumption and latency associated with such excessive retrievals) may be avoided. As a further example, incomplete and insufficient outputs (which may be generated if too few retrievals are performed) may be prevented.

Also, according to embodiments disclosed herein, the stop head layer may be trained to generate the stop output without training the rest of the generative machine learning model. Thus, embodiments disclosed herein require far fewer computational and energy resources than techniques that require training an entire machine learning model. Furthermore, due to the relatively small size of the stop head layer, the process for modifying and correcting the stop head layer (e.g., in response to incorrect determinations regarding whether additional context is required) may be significantly streamlined. Thus, techniques described herein enable contextually accurate responses to be automatically generated by a generative machine learning model in a resource-efficient manner using a computing component (e.g., the stop head layer) that can be efficiently configured and dynamically updated for ongoing improvement in accuracy and resource efficiency.

Example Generative Machine Learning Model

Figure 1:
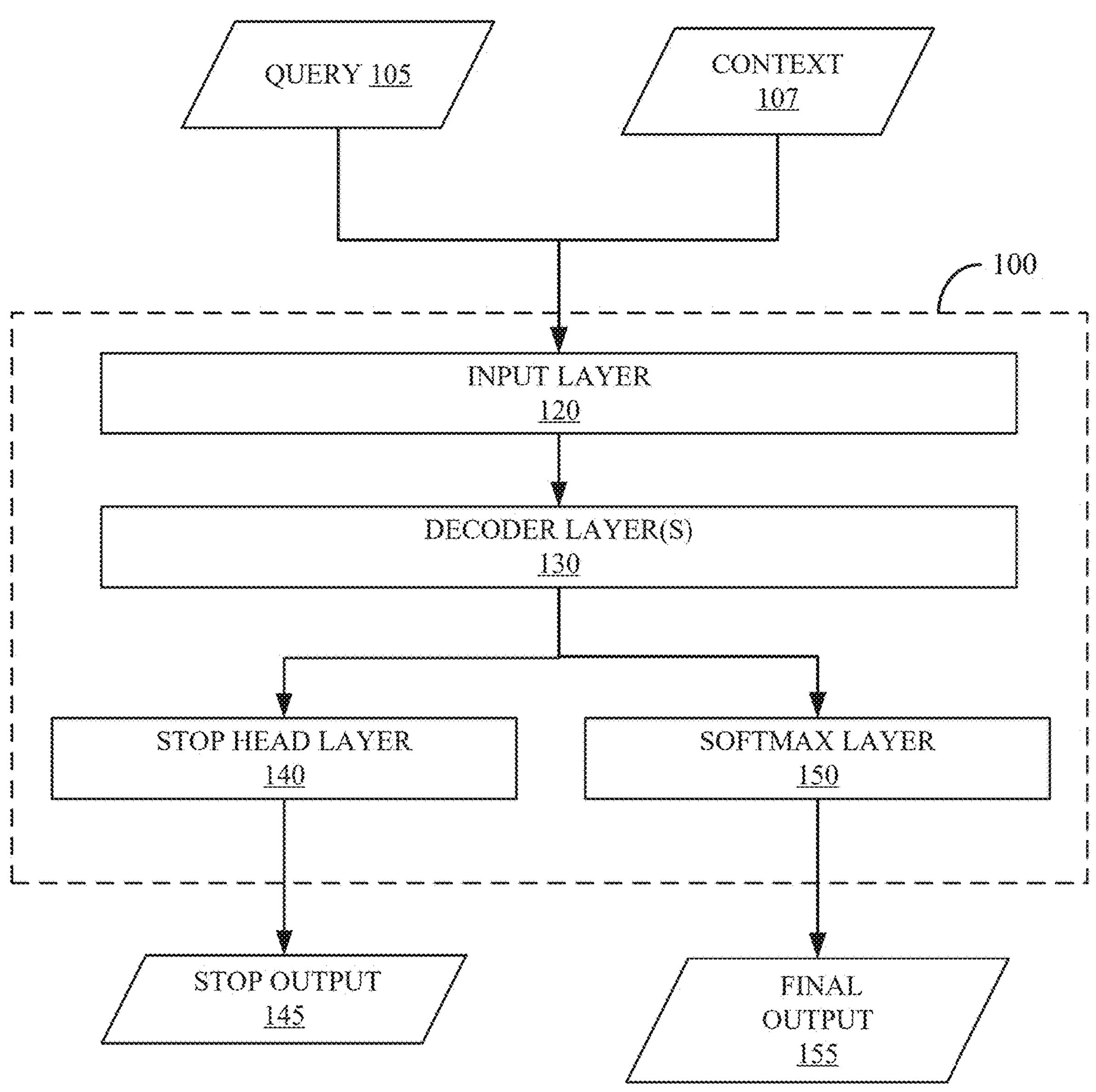
FIG. 1 depicts an example generative machine learning model according to embodiments disclosed herein.

FIG. 1 depicts an example generative machine learning model 100 according to embodiments disclosed herein.

The generative machine learning model 100 may generally be any type of generative artificial intelligence model, such as a neural network-based model. The generative machine learning model 100 comprises a multitude of layers. The first layer is input layer 120, which may process inputs provided to the model 100. For example, the first layer may comprise activation functions and/or an encoder layer. An encoder layer may generate a vector representation (e.g., an embedding representation) of the inputs to the model 100.

As shown in this example, the generative machine learning model 100 is used in a retrieval augmented generation (RAG) process. Thus, the input provided to the model 100 includes a query 105 and a context 107. The query 105 may be any type of prompt that can be provided to a generative model (e.g., a natural language prompt submitted by a user, a prompt generated by an automated system, and/or the like). The context 107 may include information related to the query 105 (e.g., information retrieved by a retrieval component used in a RAG process).

The generative machine learning model 100 further includes one or more decoder layers 130. The decoder layers 130 (which may also be referred to as hidden layers) may process an output generated by the input layer 120. The product of the processing performed by the decoder layers 130 (also referred to as a hidden state of the generative machine learning model 100) may be provided to an output layer. As shown in FIG. 1, the output layer comprises a softmax layer 150 (also referred to as a softmax head layer) and a stop head layer 140 that is parallel to the softmax layer 150. A parallel configuration for the stop head layer 140 and the softmax layer 150 may involve the stop head layer 140 and the softmax layer 150 being connected to the same decoder layer. Since the stop head layer 140 and the softmax layer 150 are parallel, the output of the last decoder layer of the decoder layers 130 may be provided to both the stop head layer 140 and the softmax layer 150.

The stop head layer 140 is a head layer of the generative machine learning model 100 that is configured to generate an output indicating the likelihood of performing a subsequent context retrieval. Thus, if the stop output 145 generated by the stop head layer 140 exceeds a threshold (or fails to exceed the threshold in alternate embodiments), then a subsequent context retrieval may be performed. If the stop output 145 generated by the stop head layer 140 fails to exceed the threshold (or exceeds the threshold in alternate embodiments), then a subsequent context retrieval may not be performed, and a final output 155 may be generated and provided to the user.

The softmax layer 150 may be used to generate tokens (e.g., words and characters) based on a softmax function. For example, the softmax function may be used to convert probability values generated by the decoder layers 130 into tokens. The tokens generated by the softmax layer 150 may form the final output 155 which is provided to the user (or provided to a computing system).

In an illustrative example, a user may submit a query 105 that includes a question. A retrieval component (discussed in further detail below with respect to FIG. 2) may be used to retrieve a context 107 that includes information related to the question in the query 105. The query 105 and context 107 may be processed through the input layer 120 and decoder layers 130. The hidden state output of one of the decoder layers may then be provided to the stop head layer 140. Further context may be retrieved if the stop output 145 indicates that more context is needed. Otherwise, the hidden state output of the decoder layer is provided to the softmax layer 150, which generates the final output 155. The final output 155 may include an answer to the question of the query 105.

Architecture of the Example Generative Machine Learning Model

The generative machine learning model 100 may be implemented using hardware and/or software. Each of the layers of the machine learning model 100 (e.g., input layer 120, decoder layers 130, stop head layer 140, and/or softmax layer 150) may comprise one or more neurons arranged in one or more neuron arrays. In an example embodiment, a neuron may comprise a register, a microprocessor, and at least one input. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. An example machine learning model may be a neural network having an input layer, an output layer, and a plurality of fully connected hidden layers (e.g., decoder layers 130). In some embodiments, a machine learning model may be implemented by an application-specific integrated circuit (ASIC). ASICs may be specially customized for a specific artificial intelligence application and provide superior computing capabilities and reduced electricity consumption compared to traditional CPUs.

The generative machine learning model 100 may further include one or more encoder layers, such as an encoder found in a Bidirectional Encoder Representations from Transformer (BERT) model or a similar model used to generate embeddings. An embedding generally refers to a vector representation of an entity that represents the entity as a vector in n-dimensional space such that similar entities are represented by vectors that are close to one another in the n-dimensional space. Embeddings may be generated through the use of an embedding model, such as an embedding layer or another type of machine learning model that learns a representation (embedding) for an entity through a training process that trains the neural network based on a data set, such as a plurality of features of a plurality of entities. In some embodiments, a hidden state output generated by an encoder layer is used to generate a subsequent hidden state output via a decoder layer.

Training Process for the Example Generative Machine Learning Model

Training the generative machine learning model 100 to perform an optimal number of retrievals in a RAG process may involve training the stop head layer 140 (e.g., independently of training the rest of generative machine learning model 100). Other layers of the model 100 may not require training (e.g., though these layers may have been trained separately, such as in a general manner, to perform generative functionality) to enable the model 100 to perform an optimal number of retrievals. Since the stop head layer 140 may be relatively small compared to the rest of the model 100 (e.g., the stop head layer 140 may include a relatively small percentage of the total weights/parameters of the model 100), training the stop head layer 140 alone may require significantly fewer computational and energy resources than a training (or fine-tuning) process that involves training the entire model 100.

The training process used to train the stop head layer 140 may involve supervised, unsupervised or semi-supervised learning techniques. Supervised learning techniques generally involve providing training inputs to a machine learning model (or one or more layers thereof). The machine learning model processes the training inputs and outputs predictions based on the training inputs. The predictions are compared to known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model (e.g., the stop head layer 140 and/or any other model/layer used in techniques described herein), such as based on validation data and test data, as is known in the art.

An example supervised learning process for the stop head layer 140 may involve a training data set that includes example hidden state outputs generated by decoder layers based on example queries and example contexts. The training data set may further include labels (e.g., created based on user input) indicating whether further context retrievals were necessary to generate a complete and accurate response to an example training query. The hidden state output may be provided to the stop head layer 140, and the stop head layer 140 may generate an output that indicates whether a subsequent retrieval should be performed. Parameters of the stop head layer 140 (e.g., the synaptic weights discussed above) may be adjusted based on a variance between the label and the output generated by the stop head layer 140. For example, the synaptic weights of the stop head layer 140 may be adjusted based on the binary cross-entropy loss between the output and the labels. The supervised learning process may continue until one or more conditions are met (e.g., until the stop head layer 140 reaches a threshold level of accuracy with respect to the training data).

Figure 2:
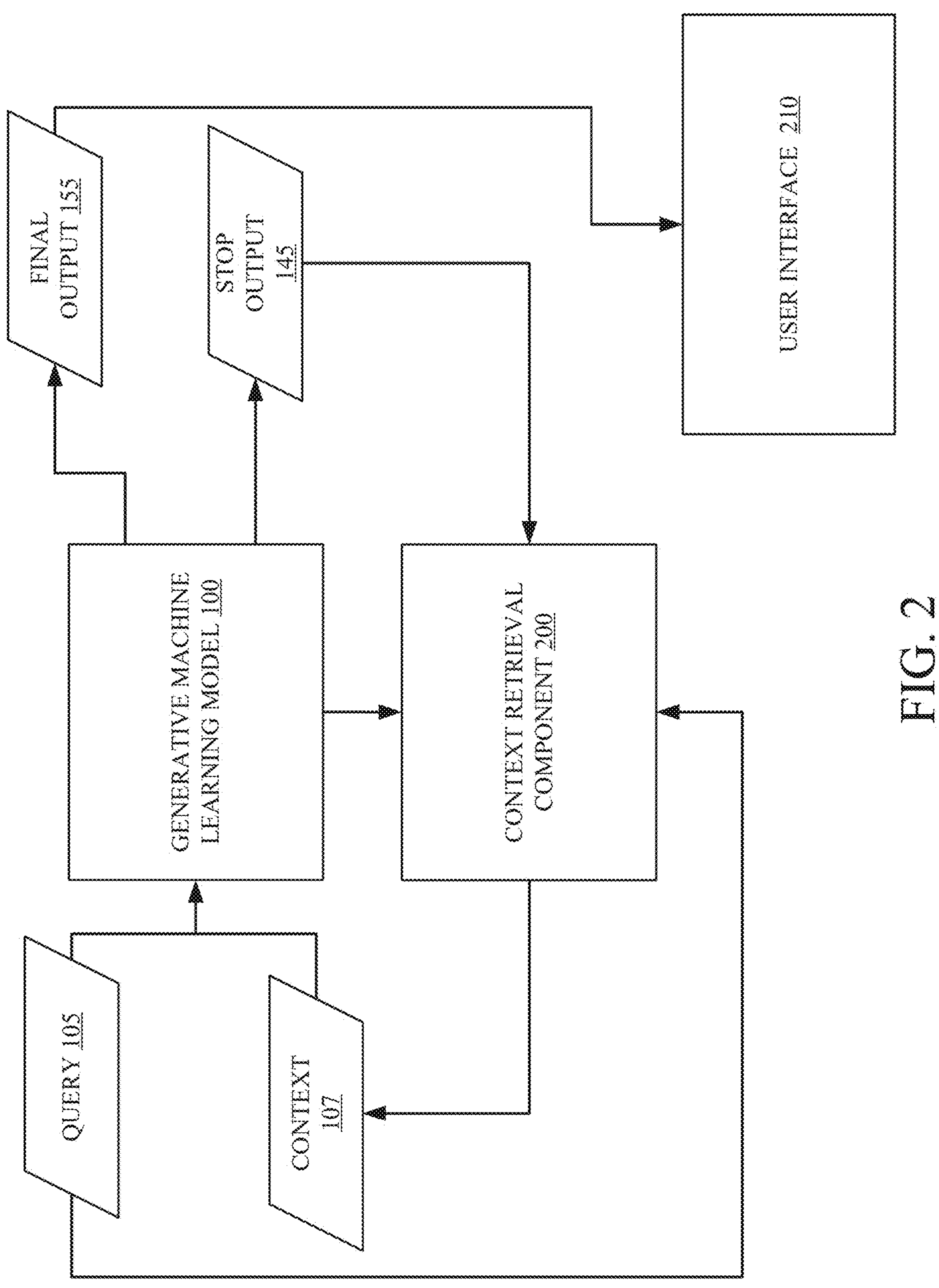
FIG. 2 depicts an example of computing components related to retrieval augmented generation according to embodiments disclosed herein.

Example Computing Components Related to a Retrieval Augmented Generation System FIG. 2 depicts an example of computing components related to a retrieval augmented generation (RAG) system.

In the example RAG system depicted in FIG. 2, a query 105 may be provided to a context retrieval component 200. The context retrieval component 200 may be implemented using one or more processors associated with a computing system. The context retrieval component 200 may, in some embodiments, comprise an embedding model (e.g., a BERT model) that is configured to generate embedding representations of queries. The embedding representation of the query 105 may be compared to embedding representations of other texts to identify texts that are semantically similar to the query 105 (e.g., using semantic similarity algorithms such as edit distance or cosine similarity). Texts that are semantically similar to the query 105 may be included in the context 107 that is retrieved and provided to the generative machine learning model 100 along with the query 105. The context retrieval component 200 may use other text retrieval techniques as known in the art of retrieval augmented generation.

The query 105 and context 107 may be provided as input to the generative machine learning model 100, described in further detail above with respect to FIG. 1. As part of a process for generating a final output 155 for the query 105, the generative machine learning model 100 may perform a sequence of reasoning steps and/or retrieval steps. In each reasoning step, the generative machine learning model 100 may synthesize the information contained in the context 107 into a response. The response may contain an indication that further information is required to generate the final output 155. After each reasoning step is completed, the decoding process may be stopped and the stop head layer 140 of the generative machine learning model 100 may be activated. The activated stop head layer 140 may be provided with a hidden state generated by a decoder layer of the generative machine learning model 100. If the stop output 145 generated by the stop head layer 140 based on the hidden state indicates that a subsequent retrieval should be performed, the generative machine learning model may perform a retrieval step. The retrieval step may include generating an additional query. The additional query may be provided to the context retrieval component 200, which may retrieve an additional context based on the additional query. The additional context (e.g., additional information requested by the additional query) may be provided as input to the generative machine learning model 100.

Based on the additional context, the generative machine learning model 100 may perform a subsequent reasoning step, generating a subsequent hidden state output. After the subsequent reasoning step, the stop head layer 140 may then be used to generate another stop head output based on the subsequent hidden state output. If this stop head output indicates that further context is required, then an additional retrieval may be performed. Otherwise, a final output 155 may be generated and provided to a user via a user interface 210. User feedback received at the user interface 210 may be used to retrain the stop head layer 140. For example, if the user feedback indicates that the final output 155 did not contain enough information and/or contained inaccurate information, training data may be created based on associating an output of a decoder layer with a label indicating that further context retrievals were necessary for generating a complete/accurate response. The stop head layer may then be retrained using the new training data. User feedback may be received in the form of natural language feedback that is processed using a machine learning model or in the form of selection of an option (e.g., "liking" or "disliking" a generated output).

Figure 3:
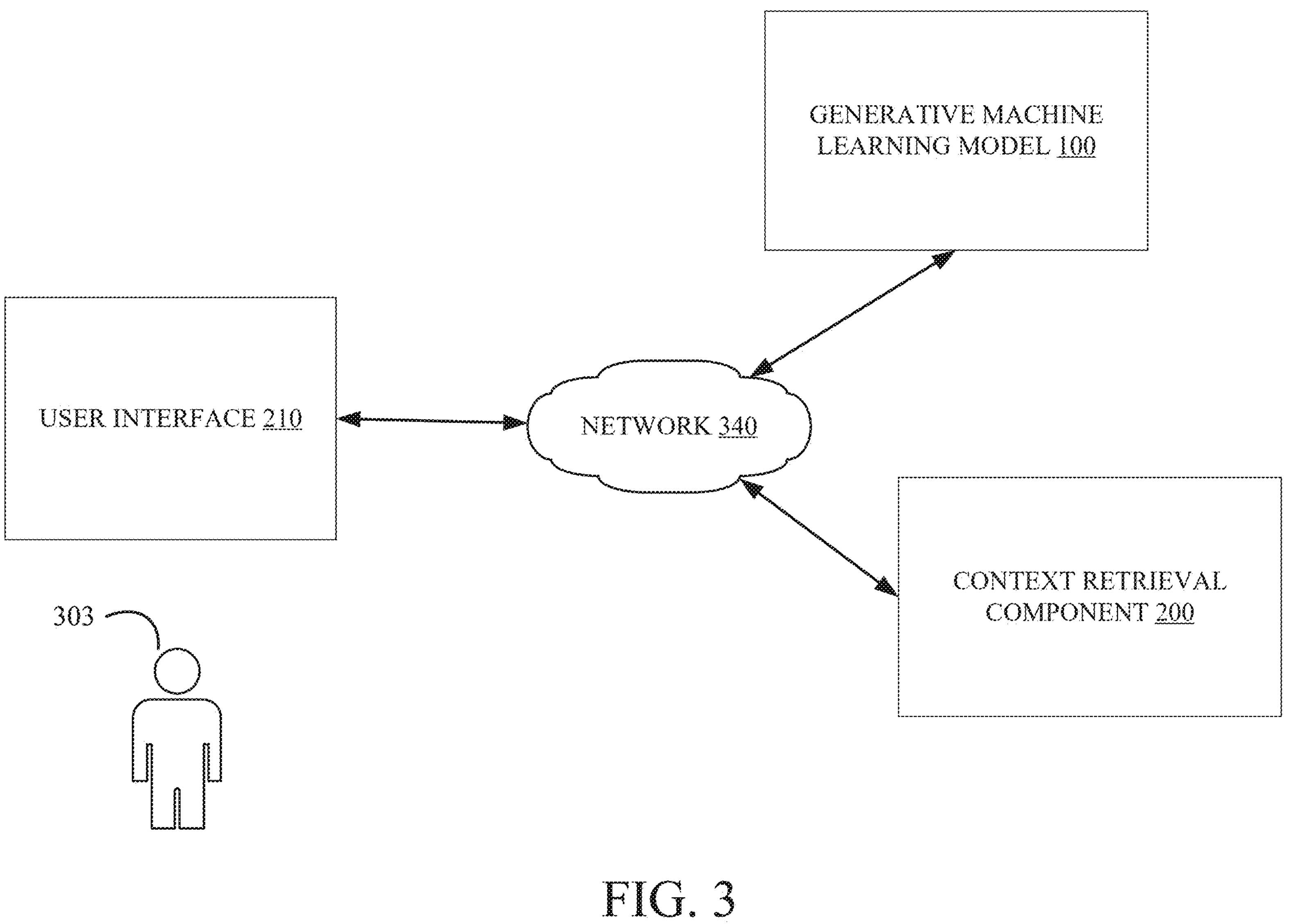
FIG. 3 depicts an additional example of computing components related to retrieval augmented generation according to embodiments disclosed herein.

FIG. 3 depicts an additional example of computing components related to a RAG system.

A user 303 may interact with the RAG system via a user interface 210 associated with a computing device. The user 303 may submit queries via the user interface 210, and responses generated by the generative machine learning model 100 based on the queries may be presented to the user 303 via the user interface 210.

The context retrieval component 200 may retrieve context based on the query submitted by the user 303. The retrieved context may be provided to the generative machine learning model 100. If additional context is required to generate a complete and accurate response to the query (as indicated based on a stop head output), then the generative machine learning model 100 may generate an additional query that is then provided to the context retrieval component 200. The context retrieval component 200 may then retrieve the additional context, which may be used by the generative machine learning model 100 to generate a final output that is provided to the user 303.

As shown in this example RAG system, user interface 210, generative machine learning model 100, and context retrieval component 200 interact over a network 340 (e.g., data may be transmitted from one component to another over network 340). Network 340 may be any connection over which data may be transmitted. In one example, network 340 is the Internet. Other embodiments provide that generative machine learning model 100, context retrieval component 200, and/or user interface 210 are implemented locally with respect to each other on one or more processors associated with the RAG system.

Example Operations Related to Retrieval Augmented Generation

Figure 4:
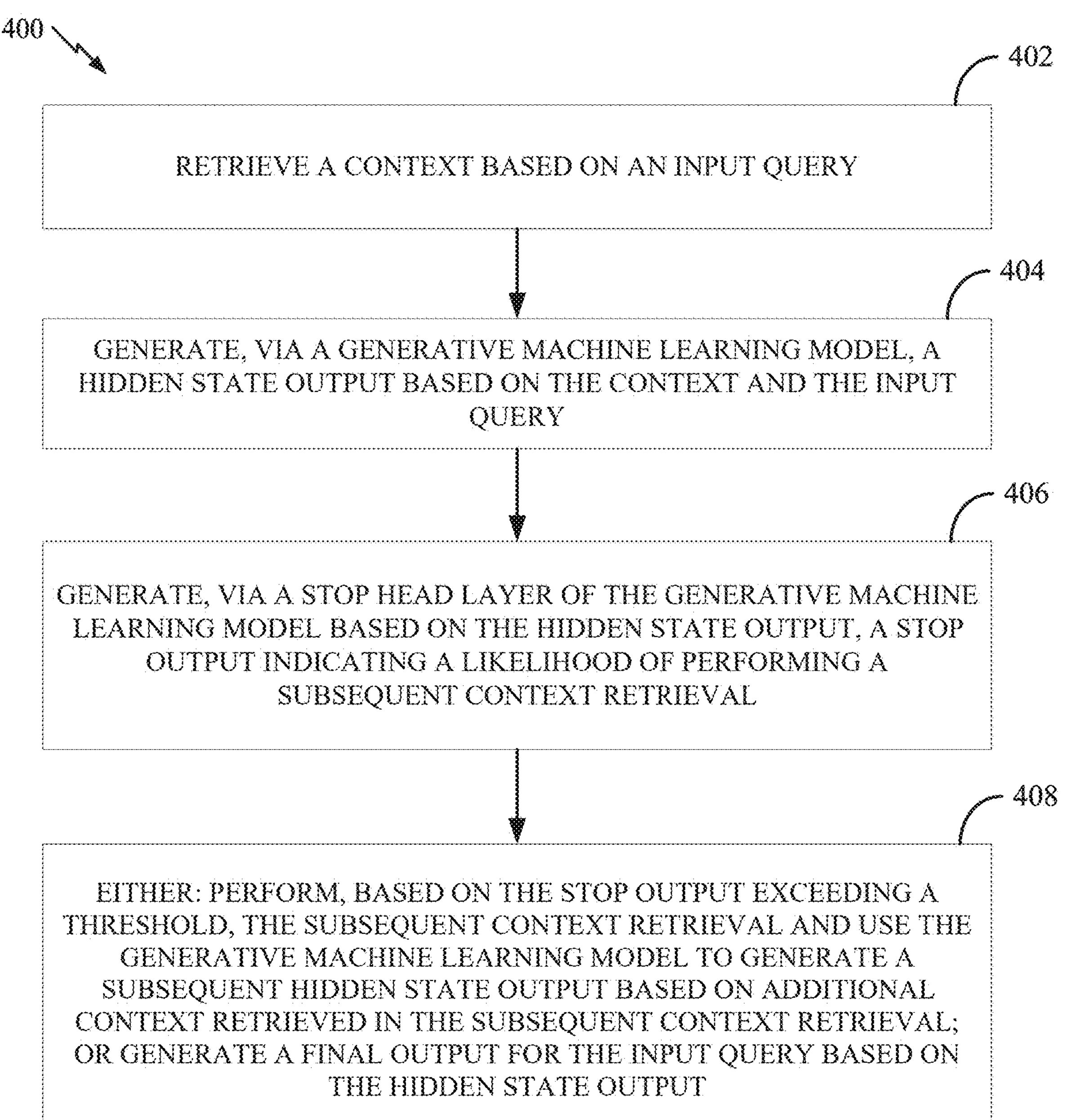
FIG. 4 depicts example operations related to retrieval augmented generation according to embodiments disclosed herein.

FIG. 4 depicts example operations 400 related to retrieval augmented generation. For example, operations 400 may be performed by one or more of the components described with respect to FIG. 1, FIG. 2, and FIG. 3.

Operations 400 begin at step 402 with retrieving a context based on an input query.

Operations 400 continue at step 404 with generating, via a generative machine learning model, an given output based on the context and the input query. In some embodiments, the generative machine learning model comprises: one or more hidden decoder layers; and an output layer comprising: the stop head layer; and a softmax head layer parallel to the stop head layer. Certain embodiments provide that each of the one or more hidden decoder layers and the output layer comprise a plurality of neurons organized in an array, wherein each neuron comprises a register, a microprocessor, and at least one input; and each neuron is connected to at least one other neuron via one of a plurality of synaptic circuits, each synaptic circuit including a memory for storing a synaptic weight. According to some embodiments, configuring the stop head layer to generate the stop output comprises training the stop head layer through a supervised learning process involving training data that comprises: a training stop output generated based on an input query and a context; and a ground truth label that indicates either: additional context is required to generate a response to the input query; or no further context is required to generate a response to the input query. Some embodiments provide that the supervised learning process comprises: generating a training stop output based on processing the training stop output through the stop head layer; and adjusting parameters of the stop head layer based on a variance between the training stop output and the ground truth label. Certain embodiments provide that the variance is calculated based on cross-entropy loss. In some embodiments, the generative machine learning model is configured such that the stop head layer is activated at a conclusion of each reasoning step.

Operations 400 continue at step 406 with generating, via a stop head layer of the generative machine learning model based on the given output, a stop output indicating a likelihood of performing a subsequent context retrieval.

Operations 400 continue at step 408 with either: performing, based on the stop output exceeding a threshold, the subsequent context retrieval and using the generative machine learning model to generate a subsequent hidden state output based on additional context retrieved in the subsequent context retrieval; or generating a final output for the input query based on the hidden state output. In certain embodiments, a user interface is used to display the final output to a user.

Example of a Processing System for Retrieval Augmented Generation

Figure 5:
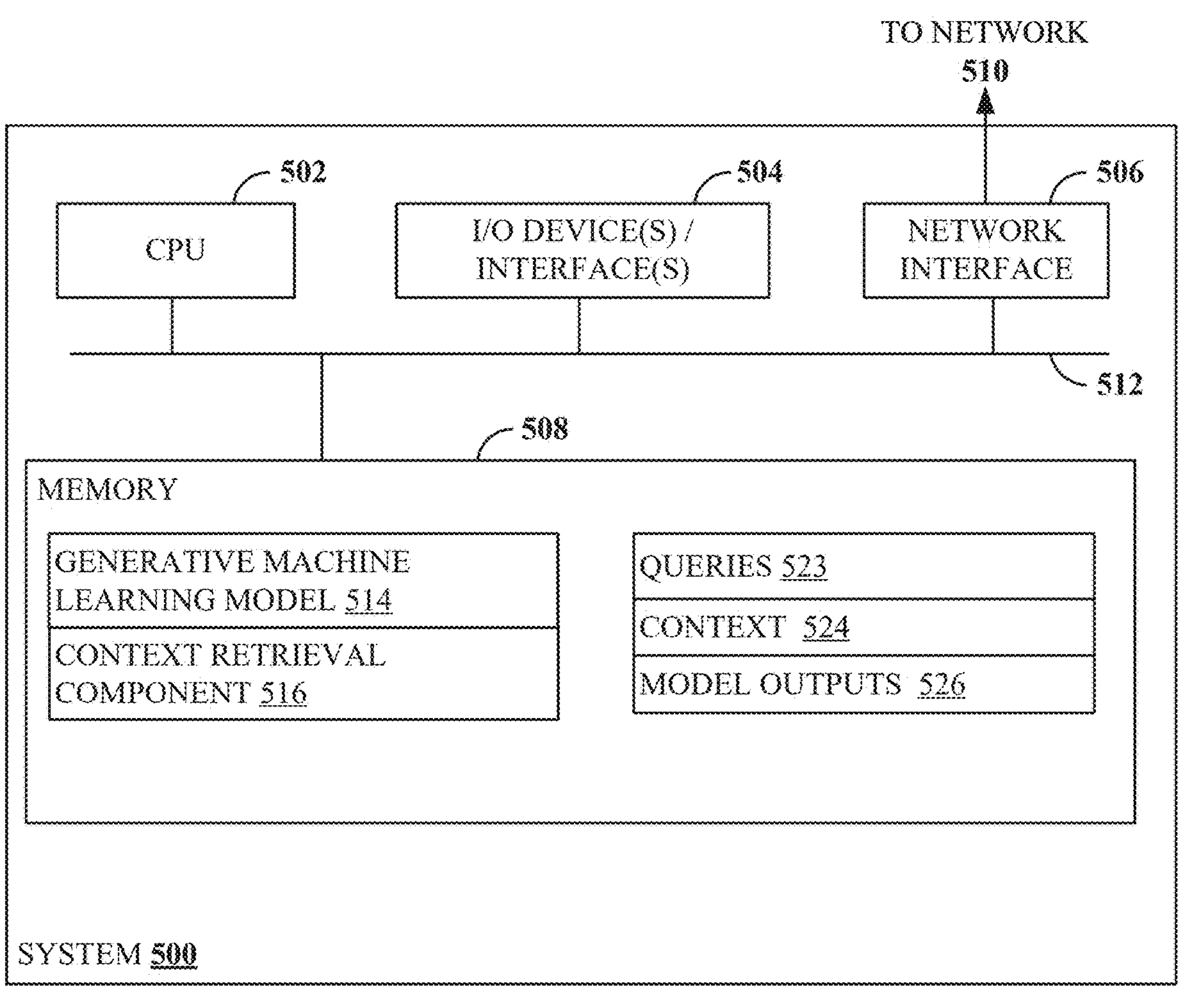
FIG. 5 depicts an example of a processing system for retrieval augmented generation according to embodiments disclosed herein.

FIG. 5 illustrates an example system 500 with which embodiments of the present disclosure may be implemented. For example, system 500 may be configured to perform operations 400 of FIG. 4 and/or to implement one or more components as in FIG. 1, FIG. 2, and/or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes generative machine learning model 514 and context retrieval component 516. Generative machine learning model 514 may be representative of generative machine learning model 100 of FIG. 1, FIG. 2, and/or FIG. 3. In some embodiments, context retrieval component 516 may be representative of context retrieval component 200 of FIG. 2 and/or FIG. 3.

Memory 508 further comprises queries 523, which may correspond to query 105 of FIG. 1 and/or FIG. 2. Memory further comprises context 524, which may correspond to context 107 of FIG. 1 and/or FIG. 2. Memory 508 further comprises model outputs 526, which may correspond to stop output 145 and final output 155 of FIG. 1 and/or FIG. 2.

It is noted that in some embodiments, system 500 may interact with one or more external components, such as via network 510, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A generative machine learning system, comprising: one or more processors; and a memory comprising instructions that, when executed by the one or more processors, cause the one or more processors to implement:

a generative machine learning model including: one or more hidden decoder layers; and an output layer comprising:

a stop head layer comprising a plurality of weights organized in a neuron array, wherein the weights are trained so that the stop head layer generates, based on a hidden state output generated by a given hidden layer of the one or more hidden decoder layers, a stop output indicating a likelihood of performing a subsequent context retrieval, and wherein the plurality of weights comprise a smaller number of weights than a number of weights of the one or more hidden decoder layers; and a softmax head layer parallel to the stop head layer, wherein the softmax head layer generates tokens of a final response based on the hidden state output in response to the stop output not exceeding a threshold; and a retrieval component configured to perform the subsequent context retrieval based on the stop output exceeding the threshold.

2. The generative machine learning system of claim 1, wherein:

each of the one or more hidden decoder layers and the output layer comprise a plurality of neurons organized in an array, wherein each neuron comprises a register, a microprocessor, and at least one input; and each neuron is connected to at least one other neuron via one of a plurality of synaptic circuits, each synaptic circuit including a memory for storing a synaptic weight.

3. The generative machine learning system of claim 1, wherein configuring the stop head layer to generate the stop output comprises training the stop head layer through a supervised learning process involving training data that comprises:

a training stop output generated by the given hidden layer based on an input query and a context; and a ground truth label that indicates either:

additional context is required to generate a response to the input query; or no further context is required to generate a response to the input query.

4. The generative machine learning system of claim 3, wherein the supervised learning process comprises:

generating a training stop output based on processing the training stop output through the stop head layer; and adjusting parameters of the stop head layer based on a variance between the training stop output and the ground truth label.

5. The generative machine learning system of claim 4, wherein the variance is calculated based on cross-entropy loss.

6. The generative machine learning system of claim 1, wherein the generative machine learning model is configured such that the stop head layer is activated at a conclusion of each reasoning step.

7. The generative machine learning system of claim 1, further comprising a user interface that is configured to display a final output to a user based on a particular stop output failing to exceed the threshold.

8. A generative machine learning system, comprising: one or more processors; and a memory comprising instructions that, when executed by the one or more processors, cause the one or more processors to:

retrieve a context based on an input query;

generate, via a generative machine learning model, a hidden state output based on the context and the input query;

generate, via a stop head layer of the generative machine learning model based on the hidden state output, a stop output indicating a likelihood of performing a subsequent context retrieval, wherein the stop head layer comprises a plurality of weights organized in a neuron array and wherein the weights are trained to generate the stop output, and wherein the plurality of weights comprise a smaller number of weights than a number of weights of one or more hidden decoder layers of the generative machine learning model; and either:

perform, based on the stop output exceeding a threshold, the subsequent context retrieval and use the generative machine learning model to generate a subsequent hidden state output based on additional context retrieved in the subsequent context retrieval; or generate, via an output layer comprising: the stop head layer, and a softmax head layer parallel to the stop head layer, a final output for the input query based on the hidden state output in response to the stop output not exceeding the threshold.

9. The generative machine learning system of claim 8, wherein: each of the one or more hidden decoder layers and the output layer comprise a plurality of neurons organized in an array, wherein each neuron comprises a register, a microprocessor, and at least one input; and each neuron is connected to at least one other neuron via one of a plurality of synaptic circuits, each synaptic circuit including a memory for storing a synaptic weight.

10. The generative machine learning system of claim 8, wherein the stop head layer to generate the stop output comprises training the stop head layer through a supervised learning process involving training data that comprises:

a training stop output generated based on an input query and a context; and a ground truth label that indicates either:

additional context is required to generate a response to the input query; or no further context is required to generate a response to the input query.

11. The generative machine learning system of claim 10, wherein the supervised learning process comprises:

generating a training stop output based on processing the training stop output through the stop head layer; and adjusting parameters of the stop head layer based on a variance between the training stop output and the ground truth label.

12. The generative machine learning system of claim 11, wherein the variance is calculated based on cross-entropy loss.

13. The generative machine learning system of claim 8, wherein the generative machine learning model is configured such that the stop head layer is activated at a conclusion of each reasoning step.

14. The generative machine learning system of claim 8, further comprising a user interface that is configured to display the final output to a user.

15. A method, comprising:

retrieving a context based on an input query;

generating, via a generative machine learning model, a hidden state output based on the context and the input query;

generating, via a stop head layer of the generative machine learning model based on the hidden state output, a stop output indicating a likelihood of performing a subsequent context retrieval, wherein the stop head layer comprises a plurality of weights organized in a neuron array and wherein the weights are trained to generate the stop output, and wherein the plurality of weights comprise a smaller number of weights than a number of weights of one or more hidden decoder layers of the generative machine learning model; and either:

performing, based on the stop output exceeding a threshold, the subsequent context retrieval and using the generative machine learning model to generate a subsequent hidden state output based on additional context retrieved in the subsequent context retrieval; or generating, via an output layer comprising: the stop head layer, and a softmax head layer parallel to the stop head layer, final output for the input query based on the hidden state output in response to the stop output not exceeding the threshold.

16. The method of claim 15, wherein: each of the one or more hidden decoder layers and the output layer comprise a plurality of neurons organized in an array, wherein each neuron comprises a register, a microprocessor, and at least one input; and each neuron is connected to at least one other neuron via one of a plurality of synaptic circuits, each synaptic circuit including a memory for storing a synaptic weight.

17. The method of claim 15, further comprising configuring the stop head layer to generate the stop output by training the stop head layer through a supervised learning process involving training data that comprises:

a training stop output generated based on an input query and a context; and a ground truth label that indicates either:

additional context is required to generate a response to the input query; or no further context is required to generate a response to the input query.

18. The method of claim 17, wherein the supervised learning process comprises:

generating a training stop output based on processing the training stop output through the stop head layer; and adjusting parameters of the stop head layer based on a variance between the training stop output and the ground truth label.

* * * * *